(12) United States Patent  
Berne et al.

(10) Patent No.: US 11,345,280 B2  
(45) Date of Patent: May 31, 2022

(54) METHOD FOR ADAPTING AN IMAGE DISPLAYED ON A MONITOR IN A VEHICLE CAB TO A VEHICLE CONFIGURATION

(71) Applicant: Volvo Truck Corporation, Gothenburg (SE)

(72) Inventors: Nicolas Berne, Heyrieux (FR); Hervé Bry, Villefontaine (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/416,291

(22) PCT Filed: Dec. 19, 2018

(86) PCT No.: PCT/EP2018/085925  
§ 371 (c)(1),  
(2) Date: Jun. 18, 2021

(87) PCT Pub. No.: WO2020/125974  
PCT Pub. Date: Jun. 25, 2020

(65) Prior Publication Data  
US 2022/0072997 A1 Mar. 10, 2022

(51) Int. Cl.  
*B60R 1/00* (2022.01)  
*G06V 20/56* (2022.01)  
(Continued)

(52) U.S. Cl.  
CPC ............... *B60R 1/00* (2013.01); *B60R 11/04* (2013.01); *G06V 20/56* (2022.01); *H04N 5/2628* (2013.01);  
(Continued)

(58) Field of Classification Search  
None  
See application file for complete search history.

(56) References Cited

U.S. PATENT DOCUMENTS

2016/0101730 A1 4/2016 Shehan et al.  
2016/0243988 A1* 8/2016 Peterson ............... B60R 1/0617  
2019/0184900 A1* 6/2019 Lang .................. H04N 5/23238

FOREIGN PATENT DOCUMENTS

DE 102013020875 A1 6/2015  
EP 2955065 A1 12/2015  
EP 3254902 A1 * 12/2017 ............... B60R 1/00

OTHER PUBLICATIONS

International Search Report and Written Opinion for International Patent Application No. PCT/EP2018/085925, dated Aug. 19, 2019, 8 pages.

* cited by examiner

*Primary Examiner* — Rebecca A Volentine  
(74) *Attorney, Agent, or Firm* — Withrow & Terranova, PLLC

(57) ABSTRACT

The invention relates to adapting to a vehicle configuration an image displayed on a monitor. The vehicle comprises a camera assembly comprising a supporting arm mounted on the cab and a camera on said supporting arm for providing a captured image of an area located rearwards and along a vehicle side. The method comprises determining if the vehicle is in a first configuration with a trailer connected to the cab or in a second configuration with no trailer connected to the cab. The method comprises automatically processing the captured image to display on the monitor either a first image corresponding which corresponds to a part of the captured image defined by a first frame when the vehicle is in the first configuration, or a second image corresponding to a part of the captured image defined by a second frame when the vehicle is in the second configuration.

18 Claims, 4 Drawing Sheets

(51) Int. Cl.
  *B60R 11/04* (2006.01)
  *H04N 5/262* (2006.01)
  *H04N 7/18* (2006.01)
(52) U.S. Cl.
  CPC ........ *H04N 7/183* (2013.01); *B60R 2300/306* (2013.01); *B60R 2300/802* (2013.01)

METHOD FOR ADAPTING AN IMAGE DISPLAYED ON A MONITOR IN A VEHICLE CAB TO A VEHICLE CONFIGURATION

This application is a 35 USC 371 national phase filing of International Application No. PCT/EP2018/085925, filed Dec. 19, 2018, the disclosure of which is incorporated herein by reference in its entirety.

TECHNICAL FIELD

The invention relates to a method for adapting to a vehicle configuration an image displayed on a monitor in a cab of the vehicle. The invention also relates to a system for adapting to a vehicle configuration an image displayed on a monitor in a cab of the vehicle. The invention further concerns a vehicle comprising such a system.

The invention is used in vehicles including a cab and a trailer that can be connected to the cab, in particular in heavy-duty vehicles, such as trucks.

BACKGROUND

A trend in industrial vehicles is to replace conventional mirrors by a camera assembly which comprises a supporting arm mounted on the vehicle cab and a camera arranged on said supporting arm, for providing a captured image of an area located rearwards and along a vehicle side. An image, resulting from the processing of the captured image, can typically be displayed on a monitor inside the driver's compartment.

The camera assembly must be arranged to provide to the vehicle driver an appropriate image displayed on the monitor, to ensure good visibility, hence safety.

To that end, various systems have been provided to change the displayed image, based on the captured image, according to various parameters. Some parameters are vehicle parameters, such as the angle of the trailer relative to the cab.

However, some vehicle configurations have not been taken into account so far. As a result, in such configurations, the image displayed on the monitor does not ensure an optimized visibility, and can be detrimental to the driver's comfort, as he/she can be obliged to manually change the camera position.

SUMMARY

An object of the invention is to provide a solution to improve rearward visibility for a vehicle's driver, without affecting comfort, especially in some specific vehicle configurations.

To that end, according to a first aspect, the invention relates to a method for adapting to a vehicle configuration an image displayed on a monitor in a cab of the vehicle, wherein the vehicle comprises a camera assembly comprising a supporting arm mounted on the cab and a camera arranged on said supporting arm, for providing a captured image of an area located rearwards and along a vehicle side.

The method comprises:
 determining a vehicle configuration, namely if the vehicle is in a first configuration—with a trailer connected to the cab—or in a second configuration—with no trailer connected to the cab;
 automatically processing the captured image, according to the determined vehicle configuration, to display on the monitor:
  either a first image which corresponds to a part of the captured image defined by a first frame, in case the vehicle is in the first configuration;
  or a second image which corresponds to a part of the captured image defined by a second frame, distinct from the first frame, in case the vehicle is in the second configuration.

Indeed, when the vehicle includes a trailer connected to the cab, it is necessary for the driver to see specific parts of the trailer, in particular the rear top portion of the trailer. However, when no trailer is connected to the cab, there is no use for the driver to see such a high area, while other components of the vehicle, i.e. of the cab in this configuration, should preferably be visible.

As a camera is generally not configured to provide an extensive field of vision, wide enough to capture an image of a large rearward area of the vehicle, an adaptation is required so that the smaller but appropriate image can be displayed on the monitor, for the driver to see the specific components and/or areas of the vehicle, depending on the vehicle configuration.

Owing to the invention, this adaptation is automatic. As it does not require any action from the driver, it improves comfort, efficiency, and ultimately safety. The geometric parameters of the first and second frames (size, location, orientation, etc. within the captured image) can typically be predetermined, depending on the regulations and/or driver's usual needs in each vehicle configuration.

Determining the vehicle configuration can be achieved by means of a detector of a trailer connection. Then, the method further comprises transmitting a vehicle configuration information provided by said detector through a vehicle internal communication network such as a CAN bus.

Determining the vehicle configuration can alternatively be achieved by means of the camera and can comprise determining if the captured image includes an image of a trailer or not. With this embodiment, the trailer can be recognized thanks to object detection by the camera assembly itself.

In an embodiment, the second frame comprises a portion of the captured image that is located below the first frame. In other words, the second image shows an area located lower than the areas shown in the first image.

The second frame can be downwardly offset relative to the first frame.

Alternatively, or in addition, the second frame can include the first frame, and possibly additionally a portion of the captured image that is located above the first frame. For example, the second image can correspond to a zoom out of the first image.

The processing step is preferably made so that the second image shows rear wheel(s) of the vehicle cab.

The method can further comprise manually adjusting the image displayed on the monitor by changing the location and/or size of the first frame in the captured image, when the vehicle is in the first configuration, and/or of the second frame in the captured image, when the vehicle is in the second configuration. Optionally, the method can further comprise storing the manual adjustment(s) as preferred setting(s) of a user.

The manual adjustment generally allows a change in a smaller range then the automatic adaptation. The aim is to even better fit to the driver's needs, by more precise settings, that accurately take into account the driver's eyes position, which depends on parameters such as the driver's height and the position of his/her seat.

According to a second aspect, the invention relates to a system for adapting to a vehicle configuration an image displayed on a monitor in a cab of the vehicle, the vehicle comprising a camera assembly comprising a supporting arm mounted on the cab and a camera arranged on said supporting arm, for providing a captured image of an area located rearwards and along a vehicle side. The system comprises:

- a determining member, for determining a vehicle configuration, namely if the vehicle is in a first configuration—with a trailer connected to the cab—or in a second configuration—with no trailer connected to the cab;
- a controller capable of receiving a vehicle configuration information from the determining member, and of automatically processing the captured image, according to said vehicle configuration information, to display on the monitor:
  - either a first image which corresponds to a part of the captured image defined by a first frame, in case the vehicle is in the first configuration;
  - or a second image which corresponds to a part of the captured image defined by a second frame, distinct from the first frame, in case the vehicle is in the second configuration.

In an embodiment, the determining member comprises a detector of a trailer connection, and in that the system further comprises a vehicle internal communication network, such as a CAN bus, which links the detector and the controller.

In an embodiment, the trailer can be recognized thanks to object detection by the camera assembly itself, which therefore acts as at least part of the determining member.

The system may further comprise:

- an adjusting device configured to allow a user to manually adjust the image displayed on the monitor by changing the location and/or size of the first frame in the captured image, when the vehicle is in the first configuration, and/or of the second frame in the captured image, when the vehicle is in the second configuration;
- optionally, a memory configured to store the manual adjustment(s) as preferred setting(s) of the user.

According to a third aspect, the invention relates to a vehicle comprising:

- a cab having front wheels and rear wheels;
- a camera assembly comprising a supporting arm mounted on the cab and a camera arranged on said supporting arm, for providing a captured image of an area located rearwards and along a vehicle side;
- a monitor located in the cab, for displaying an image based on the captured image;
- a vehicle internal communication network such as a CAN bus;
- a trailer that can be mechanically and electrically connected to the cab;
- and a system as previously described, wherein the determining member and the controller are linked by the vehicle internal communication network.

In an embodiment, the camera is fixed relative to the cab, in the use position. Then, the difference between the displayed first image and second image cannot be obtained through movement of the camera assembly relative to the cab, for providing different positions of the camera. For example, in this embodiment, the supporting arm of the camera assembly is fixedly mounted on the cab (but can be folded along the cab side when the vehicle is stopped).

The first image may correspond to a first field of vision of the camera and the second image may correspond to a second field of vision of the camera, wherein, as seen along a transverse direction, the lower boundary of the second field of vision is downwardly offset from the lower boundary of the first field of vision by an angle $\alpha$ comprised between 5 and 45°.

It has to be noted that, in case the camera is fixed relative to the cab, in the use position, the above first and second fields of vision are virtual. In other words, the camera has one real and unique field of vision. The first field of vision would be the field of vision of a virtual camera which would provide a captured image that would be identical to the first displayed image, without image processing for altering the geometrical parameters (size, position, etc.) of the image. Similarly, the second field of vision would be the field of vision of a virtual camera which would provide a captured image that would be identical to the second displayed image, without image processing for altering the geometrical parameters (size, position, etc.) of the image.

If, on the contrary, the camera can move relative to the cab, then the first and second fields of vision could be the real fields of vision of said camera when it is in two different positions.

The first and second fields of vision can have substantially the same spanning angle $\beta$. Then, the optical axis of the second field of vision is downwardly offset from the optical axis of the first field of vision by angle $\alpha$.

Alternatively, the first and second fields of vision can have substantially the same optical axis. Then, the upper boundary of the second field of vision is upwardly offset from the upper boundary of the first field of vision by an angle $\alpha'$ comprised between 5 and 45°. According to an embodiment, $\alpha'$ is substantially equal to $\alpha$.

The camera assembly and the system can be configured so that the second image shows the rear wheel(s) of the vehicle cab.

In an embodiment, the controller can be part of a camera monitoring system including the camera assembly. In other words, in this embodiment, the controller is not the electrical control unit of the vehicle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
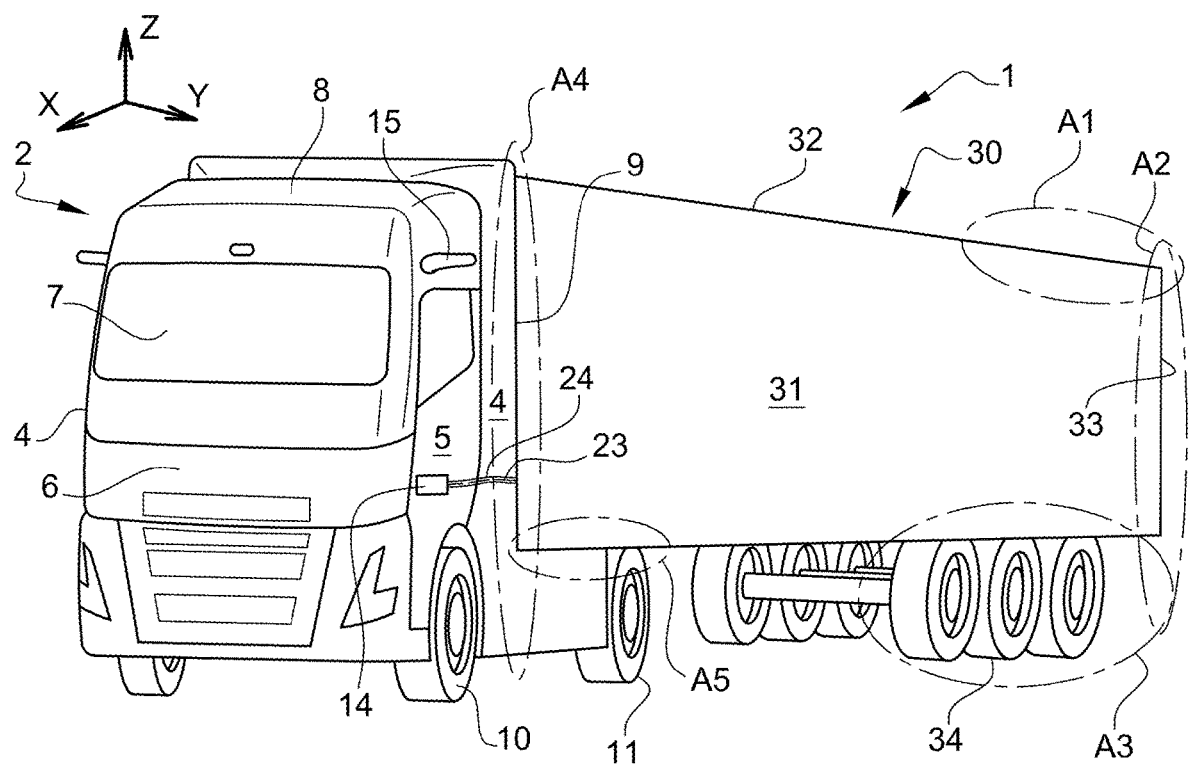
FIG. 1 is a perspective view of a vehicle according to the invention, in a first configuration.
Figure 2:
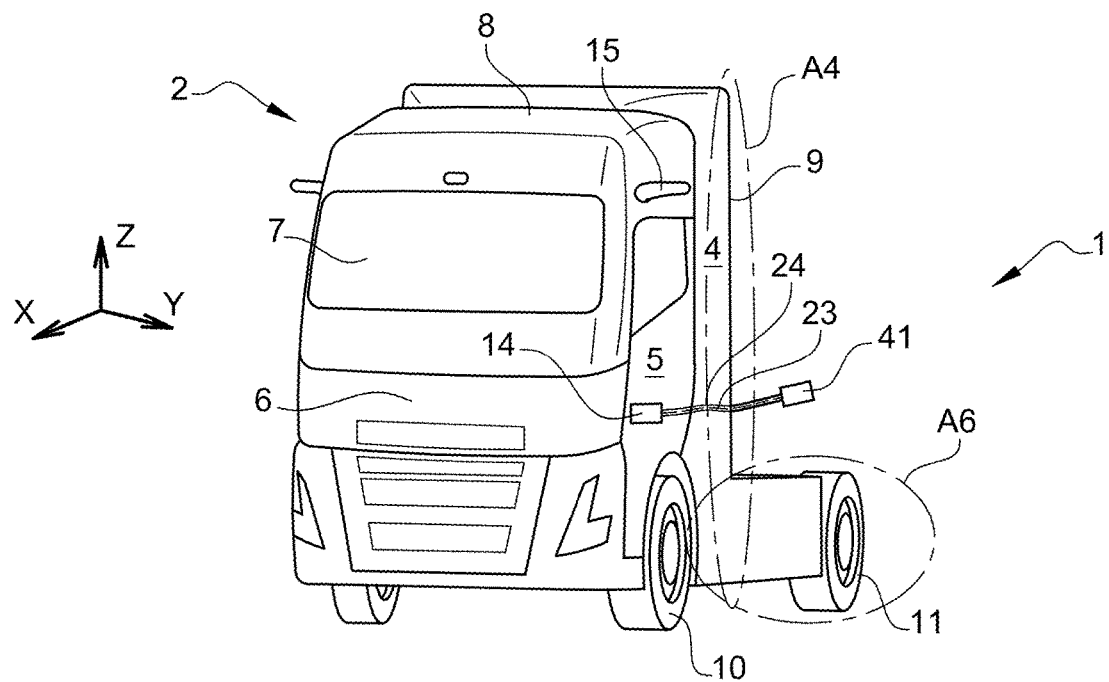
FIG. 2 is a perspective view of a vehicle according to the invention, in a second configuration.

FIGS. 1 and 2 show a vehicle 1.

The vehicle 1 comprises a cab 2 defining a driver's compartment 3. The cab 2 has side walls 4 each comprising a door 5, a front wall 6 including a windscreen 7, a top wall 8 and a rear wall 9. The cab 2 further comprises front wheels 10, and rear wheels 11. There may be provided one rear wheel or two rear wheels on each side of the cab 2.

Z is defined as the vertical direction, X is defined as the longitudinal direction of the vehicle 1, and Y is defined as the transversal direction of the vehicle 1.

The vehicle 1 may comprise an electrical control unit (ECU) 14 for controlling the various electric systems of the vehicle 1.

The vehicle 1 also comprises a camera assembly 15 mounted on the cab 2, typically above a front portion of the door 5, at least on the side wall 4 of the cab 2 adjacent the driver's seat. Basically, the camera assembly 15 comprises a supporting arm 16 and a camera 17 arranged on said supporting arm 16, for providing a captured image 50 of an area surrounding the vehicle 1, more specifically an area located rearwards and along a vehicle side. The supporting arm 16 can be fixedly mounted on the cab 2, and can be equipped with a mechanism (not shown) allowing the camera assembly 15 to be:

either in a parking position, when not in use (typically when the vehicle 1 is stopped), in which the camera assembly 15 is folded against the cab side wall 4 to prevent damages;
   or in a use position, in which the camera assembly 15 is protruding from the cab side wall 4, to allow the camera 17 to capture images (FIGS. 1 and 2).

Such a camera assembly 15 can typically be part of a so-called camera monitoring system (CMS) 20 which further includes a monitor 21 inside the driver's compartment 3 for displaying an image based on the captured image provided by the camera 17. Thus, the vehicle 1 according to the invention can be devoid of side exterior mirrors, and possibly also devoid of an interior mirror. The camera monitoring system 20 also includes a controller 22. The controller 22 can be connected to the ECU 14.

Moreover, the vehicle 1 comprises a trailer 30 which can be mechanically and electrically connected to the cab 2, as shown in FIG. 1, while in some situations the vehicle 1 can comprise only the cab 2, no trailer being connected to the cab 2, as shown in FIG. 2. The trailer 30 has side walls 31, a top wall 32 and a rear wall 33. The trailer 30 further has rear wheels 34.

The vehicle 1 also comprises a vehicle internal communication network 23, such as a CAN bus. This network 23 is part of a bundle 24 of cables of the vehicle 1 configured to establish electric connection and communication between the cab 2, the trailer 30—when connected to the cab 2—and various vehicle components. The bundle 24 of cables can typically be linked to the ECU 14.

According to the invention, the vehicle 1 comprises a system 40 for adapting an image displayed on the monitor 21, based on the captured image 50, to a vehicle configuration.

Figure 3:
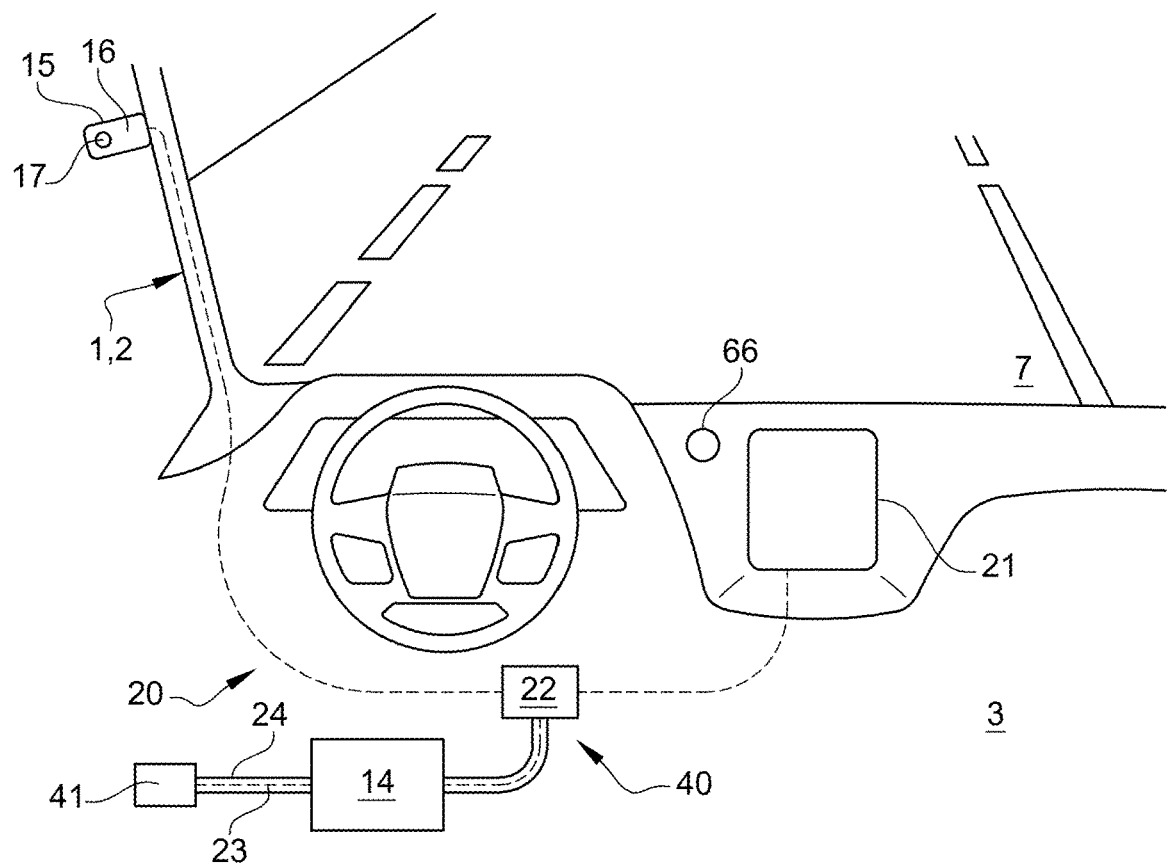
FIG. 3 is a perspective view forward from the interior of a vehicle, showing a camera assembly and a monitor for displaying an image based on the image captured by the camera assembly.

The system 40 comprises a determining member for determining a vehicle configuration. More specifically, the determining member allows determining if the vehicle 1 is in a first configuration, i.e. with the trailer 30 connected to the cab 2 as in FIG. 1, or in a second configuration, i.e. with no trailer connected to the cab 2. In practice, the determining member can comprise a detector 41 of a trailer connection. Said detector 41 is linked to the controller 22 via the vehicle internal communication network 23 (more generally via the bundle 24 of cables). The ECU 14 can possibly be arranged between the detector 41 and the controller 22, as shown in FIG. 3, or otherwise functionally connected to both the detector 41 and the controller 22.

The controller 22, which is part of the system 40, is capable of receiving the vehicle configuration information from the determining member, here the detector 41. Said information provided by the detector 41 is either "a trailer is connected", i.e. the vehicle 1 is in the first configuration, or "no trailer is connected", i.e. the vehicle 1 is in the second configuration.

According to the vehicle configuration determined by the detector 41 and the corresponding information provided to the controller 22, the controller 22 automatically processes the captured image 50, to display on the monitor 21:

either a first image 51 which corresponds to a part of the captured image 50 defined by a first frame 61, in case the vehicle 1 is in the first configuration;
   or a second image 52 which corresponds to a part of the captured image 50 defined by a second frame 62, distinct from the first frame 61, in case the vehicle 1 is in the second configuration.

Depending on the vehicle configuration, the areas of the vehicle 1 that should be visible for the driver, for driving safely and for avoiding damages to the vehicle 1 or surrounding structures, can vary.

On the one hand, as seen in FIG. 1, when the vehicle 1 is in the first configuration, with the trailer 30 connected to the cab 2, it is preferable that the driver sees on the monitor 21 an image of the following areas:

rear top portion A1 of the trailer 30;
   rear side edge A2 of the trailer 30;
   area A3 around the rear wheels 34 of the trailer 30;
   rear side edge A4 of the cab 2;
   lower front area A5 of the trailer 30.

On the other hand, as seen in FIG. 2, when the vehicle 1 is in the second configuration, with no trailer connected to the cab 2, there is no use to display on the monitor 21 an image of areas A1, A2, A3 nor A5. In this second configuration, it is preferable that the driver sees on the monitor 21 an image of the following areas:

rear side edge A4 of the cab 2;
   area A6 around the rear wheels 11 of the cab 2. Areas A5 and A6 may partly overlap.

Figure 4:
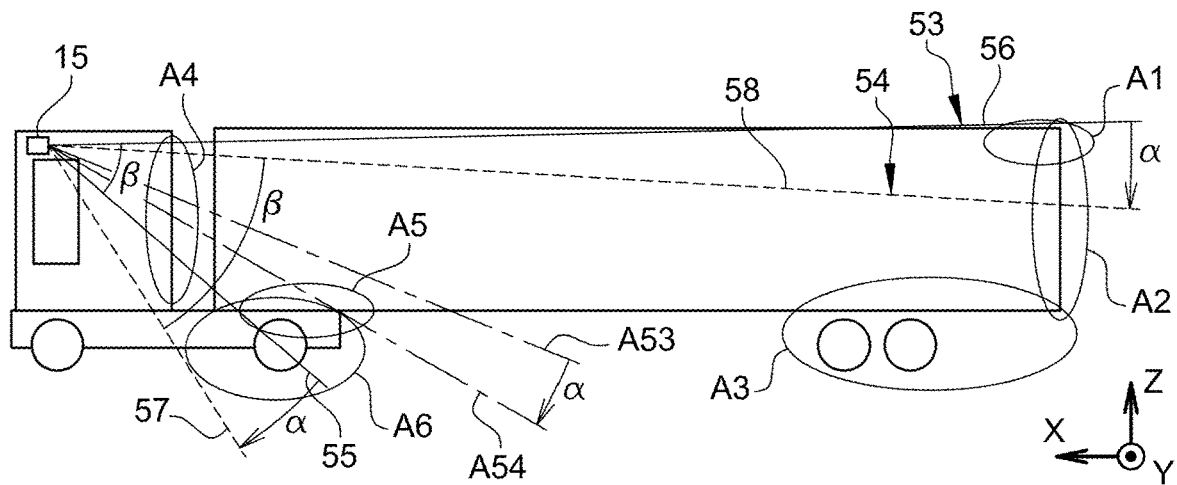
FIG. 4 is a side view of a vehicle equipped with a camera assembly, showing two different fields of vision for displaying two different images, according to an embodiment of the invention.
Figure 7:
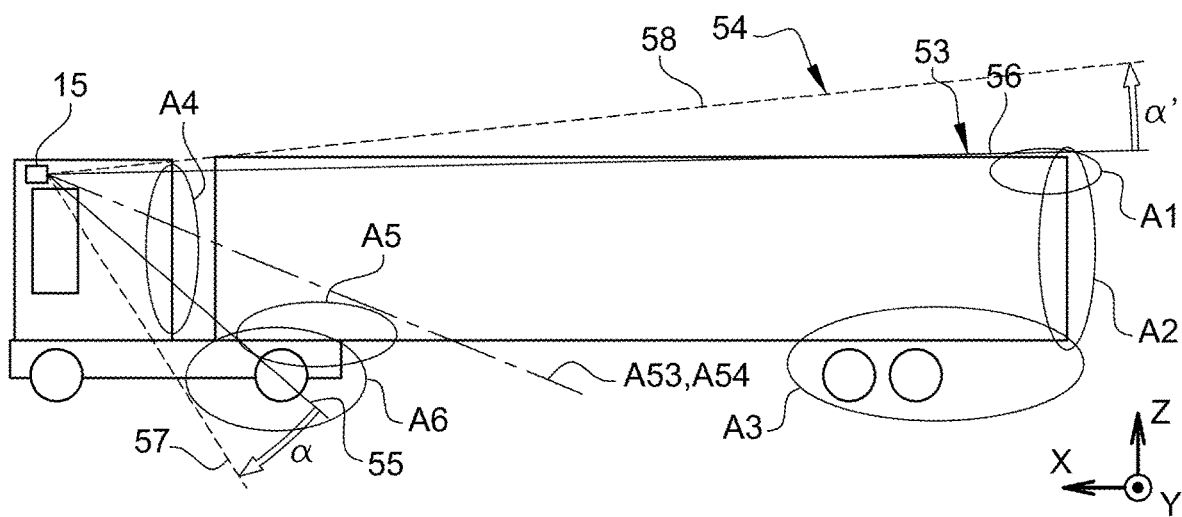
FIG. 7 is a side view of a vehicle equipped with a camera assembly, showing two different fields of vision for displaying two different images, according to another embodiment of the invention.

For that purpose, and because the camera 17 is preferably fixed relative to the cab 2, in the use position, the first image 51 displayed on the monitor 21 corresponds to a first field of vision 53 of the camera 17 which substantially includes at least areas A1, A2, A3, A4 and A5, as illustrated in FIGS. 4 and 7 in solid lines, while the second image 52 displayed on the monitor 21 corresponds to a second field of vision 54 of the camera 17 which substantially includes areas at least A4 and A6, as illustrated in FIGS. 4 and 7 in dotted lines.

In practice, the has one real and unique field of vision that includes at least the first field of vision 53 and the second field of vision 54 which are theoretically defined as follows. The first field of vision 53 would be the field of vision of a virtual camera which would provide a captured image that would be identical to the first displayed image 51, without image processing for altering the geometrical parameters (size, position, etc.) of the image. Similarly, the second field of vision 54 would be the field of vision of a virtual camera which would provide a captured image that would be identical to the second displayed image 52, without image processing for altering the geometrical parameters (size, position, etc.) of the image.

When seen along a transverse direction Y towards the vehicle 1, as in FIGS. 4 and 7, the first field of vision 53 has an optical axis A53, a lower boundary 55 and an upper boundary 56. Similarly, the second field of vision 54 has an optical axis A54, a lower boundary 57 and an upper boundary 58.

So that the first image 51 can show a fairly high area, namely rear top portion A1 of the trailer 30, and the second image 52 can show a fairly low area, namely area A6 around the rear wheels 11 of the cab 2, the lower boundary 57 of the second field of vision 54 can be downwardly offset from the lower boundary 55 of the first field of vision 53 by an angle α. This angle α can be comprised between 5 and 45°.

Figure 5:
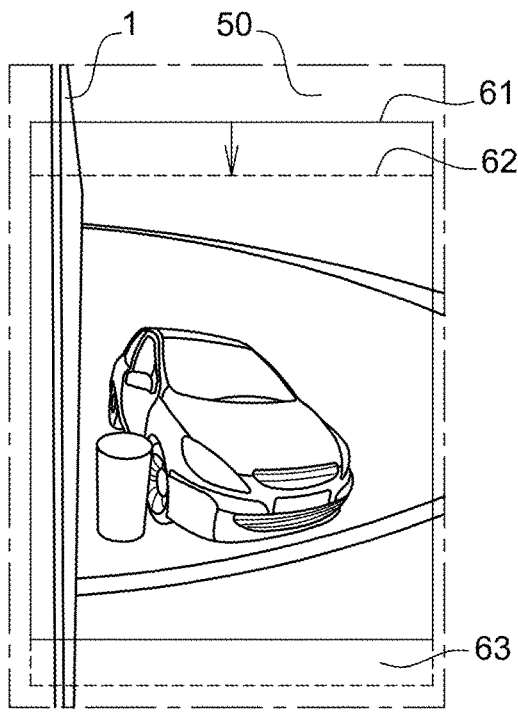
FIG. 5 shows the captured image as well as a first frame corresponding to a first displayed image and a second frame corresponding to a second displayed image, according to the embodiment of FIG. 4.
Figure 8:
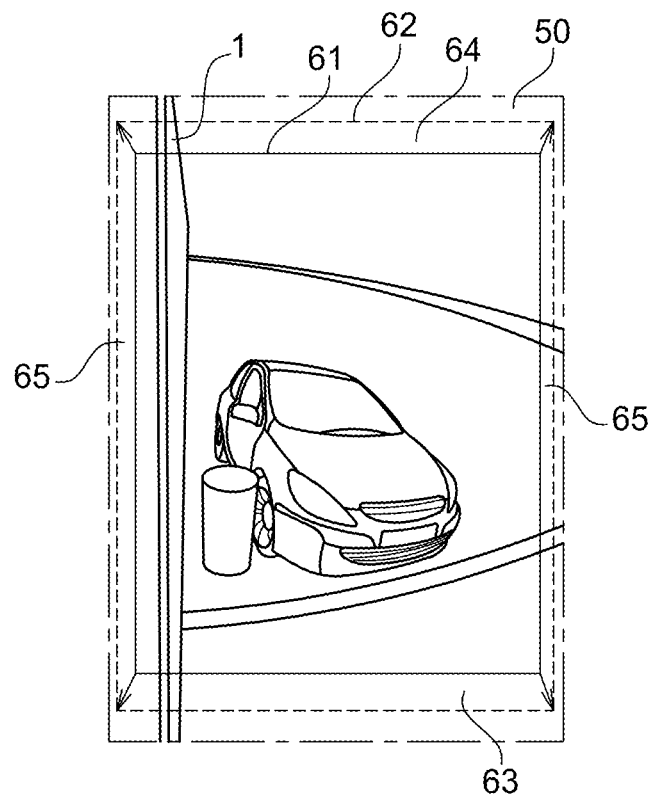
FIG. 8 shows the captured image as well as a first frame corresponding to a first displayed image and a second frame corresponding to a second displayed image, according to the embodiment of FIG. 7.

As a result, as seen in FIGS. 5 and 8, the second frame 62—which defines the second image 52—comprises a portion 63 of the captured image 50 that is located below the first frame 61—which defines the first image 51.

According to an embodiment, illustrated in FIGS. 4, 5, 6a and 6b, the first and second fields of vision 53, 54 have substantially the same spanning angle β, and the optical axis A54 of the second field of vision 54 is downwardly offset from the optical axis A53 that of the first field of vision 53 by angle α. In other words, the upper boundary 58 of the second field of vision 54 is also downwardly offset from the upper boundary 56 of the first field of vision 53 by angle α.

Figure 6A:
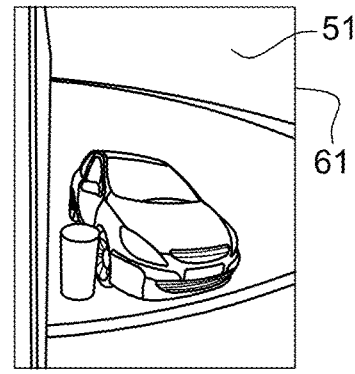
FIGS. 6a and 6b respectively show the first displayed image and the second displayed image based on the captured image of FIG. 5.
Figure 6B:
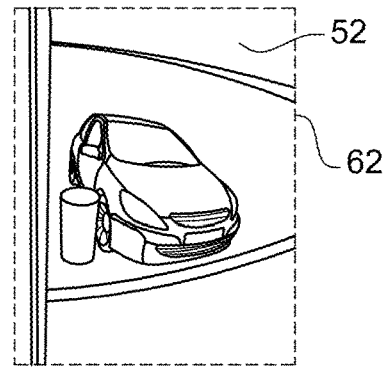

As shown in FIGS. 5, 6a and 6b, this results in the second frame 62 being downwardly offset relative to the first frame 61.

According to another embodiment, illustrated in FIGS. 7, 8, 9a and 9b, the first and second fields of vision 53, 54 have substantially the same optical axis A53, A54. Furthermore, the upper boundary 58 of the second field of vision 54 is upwardly offset from the upper boundary 56 of the first field of vision 53 by an angle α'. Angle α' can be comprised between and 45°. It can be identical to angle α.

Figure 9A:
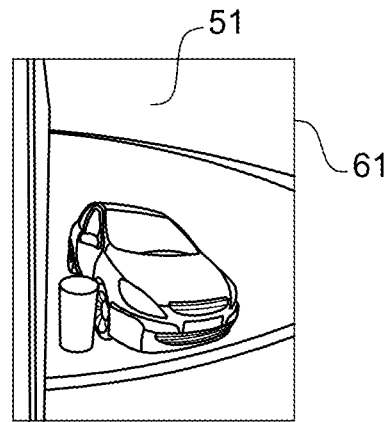
FIGS. 9a and 9b respectively show the first displayed image and the second displayed image based on the captured image of FIG. 8.
Figure 9B:
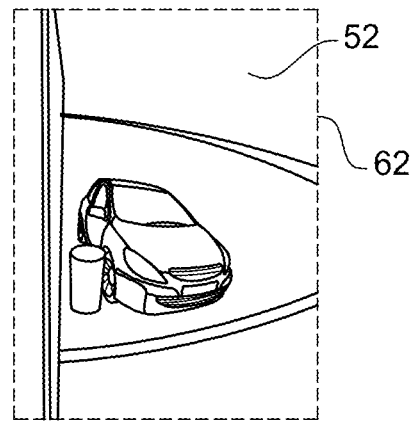

As shown in FIGS. 8, 9a and 9b, this results in the second frame 62 including the whole first frame 61, as well as the above mentioned portion 63 of the captured image 50 that is located below the first frame 61, and a portion 64 of the captured image 50 that is located above the first frame 61. The second frame 62 may also comprise side portions 65 outside and on each side of the first frame 61. In other words, the second image 52 is a zoom-out of the first image 51.

In the image processing, both a downward offset and a zoom-out can be made from the first frame 61 to obtain the second frame 62, i.e. the second image 52.

In order to even better fit to the driver's needs, there may be provided an adjusting device configured to allow a user to manually adjust the image 51, 52 displayed on the monitor 21 by changing the location and/or size of the corresponding frame 61, 62 in the captured image 50, when the vehicle 1 is in the first and/or second configuration. The adjusting device may be a rotary knob 66 or any other appropriate device. Optionally, the system 40 may include a memory (not shown) for storing said manual adjustment(s) as preferred setting(s) of the user.

It is to be understood that the present invention is not limited to the embodiments described above and illustrated in the drawings; rather, the skilled person will recognize that many changes and modifications may be made within the scope of the appended claims.

The invention claimed is:

1. A method for adapting to a vehicle configuration an image displayed on a monitor in a cab of the vehicle, the vehicle comprising a camera assembly comprising a supporting arm mounted on the cab and a camera arranged on said supporting arm, for providing a captured image of an area located rearwards and along a vehicle side, wherein the method comprises:
   determining a vehicle configuration, namely if comprising determining whether the vehicle in a first configuration with a trailer connected to the cab or in a second configuration with no trailer connected to the cab;
   automatically processing the captured image, according to of the determined vehicle configuration, to display on the monitor:
      a first image which corresponds to a part of the captured image defined by a first frame when the vehicle is in the first configuration; or
      a second image which corresponds to a part of the captured image defined by a second frame, distinct from the first frame when the vehicle is in the second configuration.

2. The method of claim 1, wherein determining the vehicle configuration is achieved by a detector of a trailer connection, and in that the method further comprises transmitting a vehicle configuration information provided by said detector through a vehicle internal communication network.

3. The method of claim 1, wherein determining the vehicle configuration is by the camera and comprises determining if the captured image includes an image of a trailer.

4. The method of claim 1, characterized in that wherein the second frame comprises a portion of the captured image that is located below the first frame.

5. The method of claim 4, wherein the second frame is downwardly offset relative to the first frame.

6. The method of claim 4, wherein the second frame includes the first frame.

7. The method of claim 1, wherein the processing step is made so that the second image shows rear wheel(s) of the vehicle cab.

8. The method of claim 1, further comprising manually adjusting the image displayed on the monitor by changing the location and/or size of the first frame in the captured image, when the vehicle is in the first configuration, and/or of the second frame in the captured image, when the vehicle is in the second configuration.

9. A system for adapting to a vehicle configuration an image displayed on a monitor in a cab of the vehicle, the vehicle comprising a camera assembly comprising a supporting arm mounted on the cab and a camera arranged on the supporting arm, for providing a captured image of an area located rearwards and along a vehicle side, the system comprising:
   a determining member, for determining a vehicle configuration, the vehicle configuration comprising a first configuration with a trailer connected to the cab or a second configuration with no trailer connected to the cab;

a controller capable of receiving a vehicle configuration information from the determining member, and of automatically processing the captured image, according to said vehicle configuration information, to display on the monitor;
  a first image which corresponds to a part of the captured image defined by a first frame when the vehicle is in the first configuration; or
  a second image which corresponds to a part of the captured image defined by a second frame, distinct from the first frame when the vehicle is in the second configuration.

10. The system of claim 9, wherein the determining member comprises a detector of a trailer connection, and the system further comprises a vehicle internal communication network which links the detector and the controller.

11. The system of claim 9, characterized in that wherein it further comprises further comprising:
  an adjusting device configured to allow a user to manually adjust the image displayed on the monitor by changing the location and/or size of the first frame in the captured image, when the vehicle is in the first configuration, and/or of the second frame in the captured image, when the vehicle is in the second configuration.

12. A vehicle comprising:
  a cab having front wheels and rear wheels;
  a camera assembly comprising a supporting arm mounted on the cab and a camera arranged on said supporting arm, for providing a captured image of an area located rearwards and along a vehicle side;
  a monitor located in the cab, for displaying an image based on the captured image;
  a vehicle internal communication network;
  a trailer that can be mechanically and electrically connected to the cab;
  a system, comprising:
    a determining member for determining a vehicle configuration, the vehicle configuration comprising a first configuration with a trailer connected to the cab or a second configuration with no trailer connected to the cab;
    - a controller capable of receiving a vehicle configuration information from the determining member, and of automatically processing the captured image, according to said vehicle configuration information, to display on the monitor:
      a first image which corresponds to a part of the captured image defined by a first frame when the vehicle is in the first configuration; or
      a second image which corresponds to a part of the captured image defined by a second frame, distinct from the first frame when the vehicle is in the second configuration;
    wherein the determining member and the controller are linked by the vehicle internal communication network.

13. The vehicle of claim 12, wherein the camera is fixed relative to the cab, in the use position.

14. The vehicle of claim 12, wherein the first image corresponds to a first field of vision of the camera and the second image corresponds to a second field of vision of the camera, wherein, as seen along a transverse direction, the lower boundary of the second field of vision is downwardly offset from the lower boundary of the first field of vision by an angle ($\alpha$) comprised between 5 and 45°.

15. The vehicle of claim 14, wherein the first and second fields of vision have substantially the same spanning angle ($\beta$), and in that the optical axis of the second field of vision is downwardly offset from the optical axis of the first field of vision by the angle ($\alpha$).

16. The vehicle according to of claim 14, characterized in that wherein the first and second fields of vision have substantially the same optical axis, and in that the upper boundary of the second field of vision is upwardly offset from the upper boundary of the first field of vision by an angle ($\alpha'$) comprised between 5 and 45°.

17. The vehicle of claim 12, wherein the camera assembly and the system are configured so that the second image shows the rear wheel(s) of the vehicle cab.

18. The vehicle of claim 12, wherein the controller is part of a camera monitoring system including the camera assembly.

* * * * *